(12) United States Patent
Park (10) Patent No.: US 12,439,377 B1
(45) Date of Patent: Oct. 7, 2025

(54) METHOD AND APPARATUS FOR PAGING CHANNEL MONITORING IN ASSOCIATION WITH SMALL DATA TRANSMISSION PROCEDURE

(71) Applicant: Mentats Co., Ltd., Seoul (KR)

(72) Inventor: DaeHeum Park, Suwon-si (KR)

(73) Assignee: Mentats Co., Ltd., Seoul (KR)

( * ) Notice: Subject to any disclaimer, the term of this patent is extended or adjusted under 35 U.S.C. 154(b) by 0 days.

(21) Appl. No.: 19/241,855

(22) Filed: Jun. 18, 2025

(30) Foreign Application Priority Data

Aug. 30, 2024 (KR) .................. 10-2024-0118073

(51) Int. Cl.
*H04W 68/02* (2009.01)

(52) U.S. Cl.
CPC .................. *H04W 68/02* (2013.01)

(58) Field of Classification Search
CPC .................................................. H04W 68/02
USPC ...................................................... 455/458
See application file for complete search history.

(56) References Cited

U.S. PATENT DOCUMENTS

2023/0217499 A1* 7/2023 Jeon .................. H04W 76/30

* cited by examiner

*Primary Examiner* — Joel Ajayi
(74) *Attorney, Agent, or Firm* — Bridgeway IP Law Group, PLLC; Jihun Kim (57) ABSTRACT

Provided are a method and apparatus for monitoring a paging channel in association with a small data transmission procedure in a wireless communication system. A terminal may initiate a small data transmission (SDT) procedure. Further, the terminal may monitor a paging channel, while the initiated SDT procedure is ongoing and a timer is not running. The timer may be associated with handling a failure in resumption of a radio resource control (RRC) connection. The paging channel may be monitored based on that i) the SDT procedure is associated with configured grant (CG) SDT and ii) an extended CG SDT periodicity is configured. The extended CG SDT periodicity may be used to calculate a transmission periodicity for uplink that corresponds to a resource determined using hyper system frame number (H-SFN) information and system frame number (SFN) information.

12 Claims, 7 Drawing Sheets

METHOD AND APPARATUS FOR PAGING CHANNEL MONITORING IN ASSOCIATION WITH SMALL DATA TRANSMISSION PROCEDURE

CROSS-REFERENCE TO RELATED APPLICATIONS

This application claims the priority of Korean Patent Application No. 10-2024-0118073 filed on Aug. 30, 2024, in the Korean Intellectual Property Office, the disclosure of which is incorporated herein by reference.

BACKGROUND OF THE DISCLOSURE

Field of the Disclosure

The present disclosure relates to a wireless communication system applicable to 4G, 5G and 6G.

Related Art

With the continuous development of mobile communication technologies, the transition from 4G to 5G has brought about significant improvements in various aspects of wireless communication. These advancements are designed to meet the ever-growing demands of modern applications, such as high-speed mobile broadband, massive connectivity for Internet of Things (IoT) devices, and ultra-reliable low-latency communications. The key areas of development in 5G can be categorized into enhanced Mobile Broadband (eMBB), massive Machine Type Communications (mMTC), and Ultra-Reliable Low-Latency Communications (URLLC), each addressing distinct use cases and requirements that were challenging for 4G technologies.

Enhanced Mobile Broadband (eMBB)

In 4G, Long-Term Evolution (LTE) technology provided high-speed mobile broadband, with peak download speeds reaching up to 1 Gbps. While this met the needs of high-definition video streaming, mobile gaming, and other data-intensive services, the increasing demand for higher speeds and larger data volumes necessitated further innovation. 5G addresses these challenges by offering up to 20 Gbps download speeds, enabling new applications such as 4K/8K video streaming, virtual reality (VR), augmented reality (AR), and large-scale data transfers. The introduction of technologies such as massive MIMO, beamforming, and the use of millimeter-wave frequencies have enabled 5G to deliver these improved capabilities, meeting the growing demand for mobile broadband.

Massive Machine Type Communications (mMTC)

The emergence of the Internet of Things (IoT) has brought about the need for a vast number of connected devices. However, 4G LTE technology was not optimized for massive device connectivity, as it primarily focused on human-to-human communication. Moreover, 4G faced limitations in terms of energy efficiency, scalability, and the ability to handle a large number of connected devices simultaneously. 5G addresses these issues by introducing mMTC, which supports the connection of millions of devices with minimal energy consumption and long battery life. By utilizing Low-Power Wide-Area Networks (LPWAN) and network slicing, 5G ensures efficient connectivity for massive IoT deployments, including smart cities, agriculture, healthcare, and other large-scale IoT ecosystems.

Ultra-Reliable Low-Latency Communications (URLLC)

4G networks, while offering low latency for mobile broadband, were not optimized for ultra-reliable and real-time communication, which is essential for applications such as autonomous driving, remote surgery, and industrial automation. The need for ultra-reliable, low-latency communication with near-instantaneous response times prompted the development of URLLC in 5G. With 5G, latency is reduced to as low as 1 millisecond, enabling real-time communication and control. This advancement is critical for applications that require immediate decision-making, such as autonomous vehicles that rely on real-time vehicle-to-vehicle and vehicle-to-infrastructure communication, as well as remote medical procedures and industrial automation systems that require precise, instantaneous control.

These developments have made 5G a pivotal technology in transforming the way industries operate and society interacts with the digital world. The ongoing evolution from 4G to 5G represents a significant leap forward in enabling new use cases, increasing network efficiency, and enhancing user experience.

Looking ahead, 6G is expected to further expand the capabilities of 5G, focusing on even higher speeds, ultra-high reliability, and the integration of advanced technologies like AI and holographic communications. It is anticipated that 6G will enable more immersive and seamless experiences, such as truly ubiquitous connectivity, advanced immersive technologies like mixed reality (XR), and autonomous systems that operate in real-time with zero latency. The evolution from 4G to 5G and eventually to 6G highlights the continuous progress in wireless communication technologies and their increasing role in shaping the future of the digital world.

SUMMARY OF THE DISCLOSURE

The disclosure is to provide a method and apparatus for efficiently monitoring a paging channel in association with a small data transmission procedure in a wireless communication system.

According to an embodiment, a method of a terminal may be provided for operating in a wireless communication system. The method of the terminal may include initiating a small data transmission (SDT) procedure. The method of the terminal may further include monitoring a paging channel, while the initiated SDT procedure is ongoing and a timer is not running. The timer may be associated with handling a failure in resumption of a radio resource control (RRC) connection. The paging channel may be monitored based on that i) the SDT procedure is associated with configured grant (CG) SDT, and ii) an extended CG SDT periodicity is configured. The extended CG SDT periodicity may be used to calculate a transmission periodicity for uplink that corresponds to a resource determined using hyper system frame number (H-SFN) information and system frame number (SFN) information.

According to another embodiment, a terminal may be provided for operating in a wireless communication system. The terminal may include a processor configured to cause the terminal to initiate a small data transmission (SDT) procedure. The processor is further configured to cause the terminal to monitor a paging channel, while the initiated SDT procedure is ongoing and a timer is not running. The timer may be associated with handling a failure in resumption of a radio resource control (RRC) connection. The paging channel may be monitored based on that i) the SDT procedure is associated with configured grant (CG) SDT, and ii) an extended CG SDT periodicity is configured. The extended CG SDT periodicity may be used to calculate a transmission periodicity for uplink that corresponds to a resource determined using hyper system frame number (H-SFN) information and system frame number (SFN) information.

The extended CG SDT periodicity, the H-SFN information and the SFN information may be received in a single RRC information element. Here, The H-SFN information and the SFN information may be used for determination of an offset of the resource in time domain.

The SDT procedure may be initiated in an RRC inactive state.

Meanwhile, the extended CG SDT periodicity may be defined by n*14*1280, where n is a periodicity configuration value. The periodicity configuration value may be configured by one value in a first set consisting of 1, 2, 4, 8, 48, 96, 240, 472, 944, 1408 and 2816 for a subcarrier spacing (SCS) of 15 kHz, in a second set consisting of 2, 4, 8, 16, 96, 192, 480, 944, 1888, 2816 and 5632 for a SCS of 30 kHz, in a third set consisting of 4, 8, 16, 32, 192, 384, 960, 1888, 3776, 5632 and 11264 for a SCS of 60 kHz, in a fourth set consisting of 8, 16, 32, 64, 384, 768, 1920, 3776, 7552, 11264 and 22528 for a SCS of 120 kH, in a fifth set consisting of 32, 64, 128, 256, 1536, 3072, 7680, 15104, 30208, 45056 and 90112 for a SCS of 480 kHz, or in a sixth set consisting of 64, 128, 256, 512, 3072, 6144, 15360, 30208, 60416, 90112 and 180224 for a SCS of 960 kHz.

Alternatively, the extended CG SDT periodicity may be defined by n*12*1280, where n is a periodicity configuration value. The periodicity configuration value may be configured by one value in a third set consisting of 4, 8, 16, 32, 192, 384, 960, 1888, 3776, 5632 and 11264 for a subcarrier spacing (SCS) of 60 KHz.

DESCRIPTION OF EXEMPLARY EMBODIMENTS

The technical terms used in this disclosure are intended to describe specific embodiments and should not be construed as limiting. Unless otherwise defined, these terms should be interpreted according to their generally understood meanings by those skilled in the art, without being overly broad or narrow. If a term does not fully represent the spirit of the disclosure, it should be understood as the most accurate technical term recognized by those skilled in the art.

The use of a slash (/) or a comma in the present disclosure may represent "and/or." For example, "A/B" may indicate "A and/or B," meaning it can refer to "only A," "only B," or "both A and B.".

Figure 1:
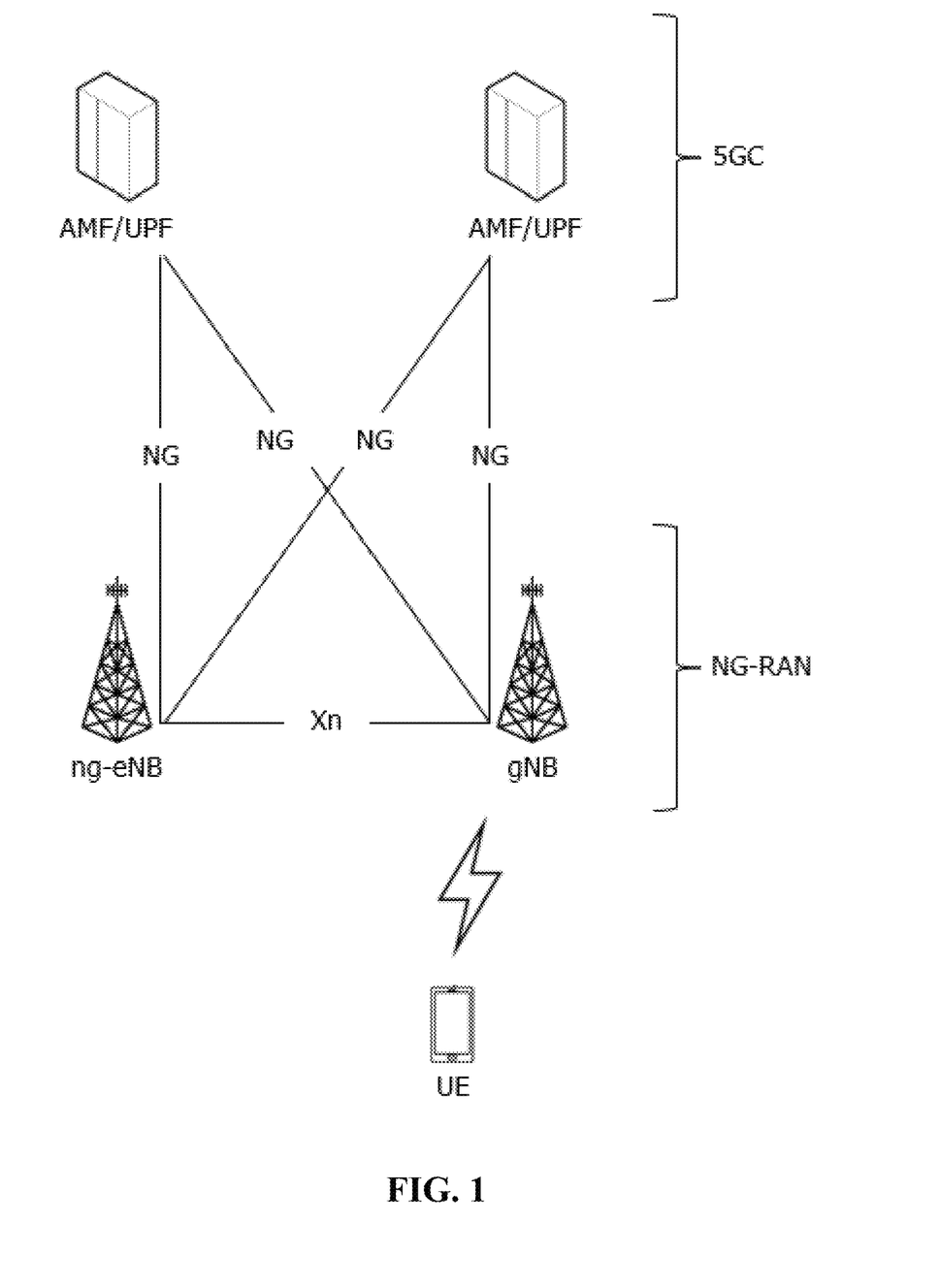
FIG. 1 illustrates a wireless communication system.

FIG. 1 illustrates a wireless communication system.

Referring to FIG. 1, the wireless communication system may be classified into a 5G core network (5GC) and a next generation-radio access network (NG-RAN), and the NG-RAN may include a base station (gNB and/or ng-eNB) that provides user plane and control plane protocol termination to a terminal (user equipment, UE). A next generation-Node B (gNB) provides an NR user plane and control plane protocol termination to the terminal, and a next generation-evolved node B (ng-eNB) provides an evolved-universal terrestrial radio access (E-UTRA) user plane and control plane protocol termination to the terminal (UE). The terminal (UE) may be fixed or mobile, and may be referred to as another term such as a mobile station (MS), a user terminal (UT), a subscriber station (SS), a mobile terminal (MT), a wireless device, etc. The base station (gNB and/or ng-eNB) may be a fixed station communicating with the terminal (UE), and may be referred to as another term such as a base transceiver system (BTS), an access point, etc.

The base station (gNB and/or ng-eNB) may be connected to each other through an Xn interface, and may be connected to a 5G core network (5GC) through an NG interface. Specifically, the base station (gNB and/or ng-eNB) may be connected to an access and mobility management function (AMF) through an NG-C interface, and may be connected to a user plane function (UPF) through an NG-U interface.

Figure 2:
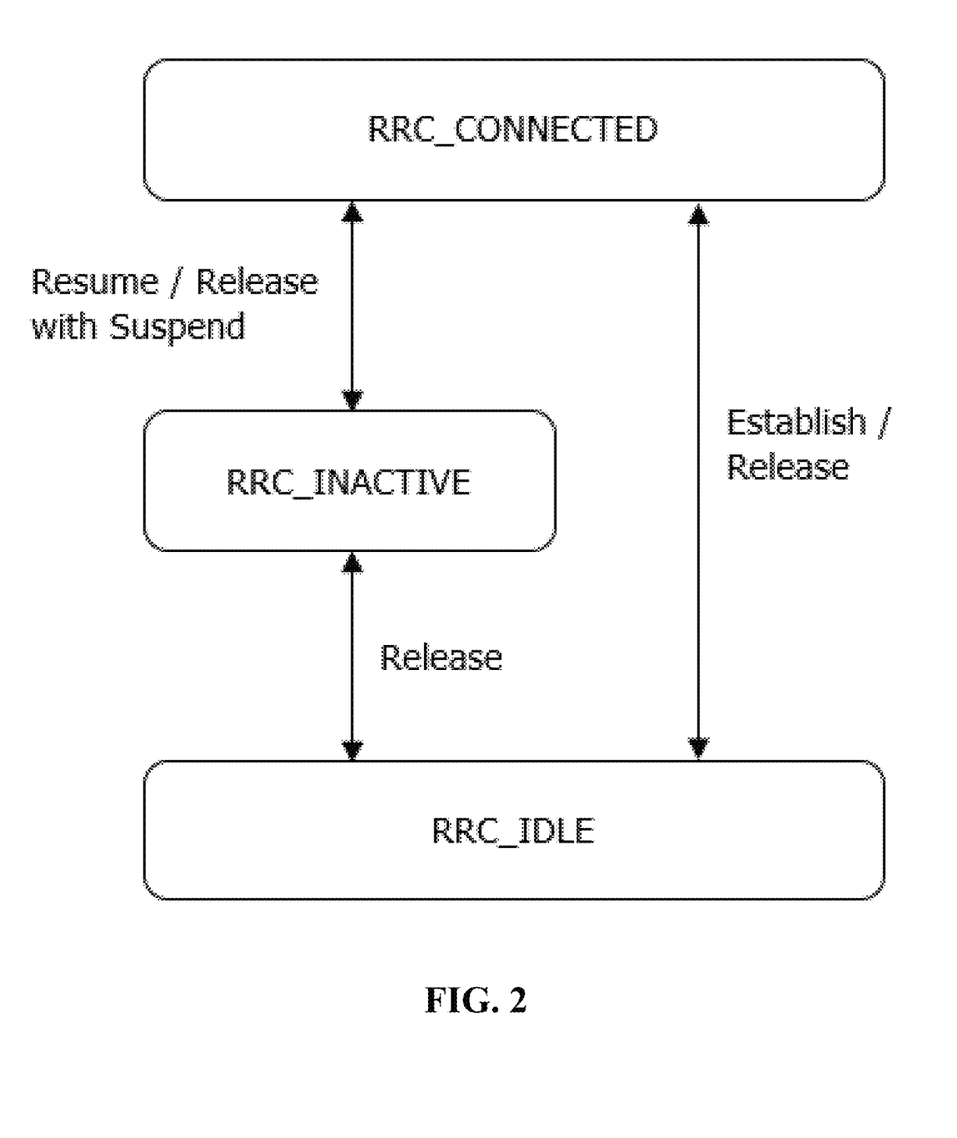
FIG. 2 illustrates UE state machine and state transitions in NR.

FIG. 2 illustrates UE state machine and state transitions in NR.

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

1. RRC_IDLE:
    A UE specific DRX (Discontinuous Reception) may be configured by upper layers;
    At lower layers, the UE may be configured with a DRX for PTM (Point to Multipoint) transmission of MBS (Multicast/Broadcast Services) broadcast;
    UE controlled mobility based on network configuration;
    The UE:
    i) Monitors Short Messages transmitted with P-RNTI (Paging-RNTI) over DCI (Downlink Control Information);
    ii) Monitors a Paging channel for CN (Core Network) paging using 5G-S-TMSI (5G-Serving-Temporary Mobile Subscriber Identity), except if the UE is acting as a L2 (Layer 2) U2N (UE-to-Network) Remote UE;
    iii) If configured by upper layers for MBS multicast reception, monitors a Paging channel for CN paging using TMGI (Temporary Mobile Group Identity);
    iv) Performs neighbouring cell measurements and cell (re-)selection;
    v) Performs measurements on L2 U2N Relay UEs and relay (re-)selection;
    vi) Acquires system information and can send SI request (if configured);
    vii) Performs logging of available measurements together with location and time for logged measurement configured UEs;
    viii) Performs idle/inactive measurements for idle/inactive measurement configured UEs;
    ix) If configured by upper layers for MBS broadcast reception, acquires MCCH change notification and MBS broadcast control information and data.

2. RRC_INACTIVE:
   A UE specific DRX may be configured by upper layers or by RRC layer;
   At lower layers, the UE may be configured with a DRX for PTM transmission of MBS broadcast and/or a DRX for PTM transmission of MBS multicast;
   UE controlled mobility based on network configuration;
   The UE stores the UE Inactive AS (Access Stratum) context;
   A RAN-based notification area is configured by RRC layer;
   Transfer of unicast data and/or signalling to/from UE over radio bearers configured for SDT.
   The UE:
   i) Monitors Short Messages transmitted with P-RNTI over DCI;
   ii) While T319a is running, monitors control channels associated with the shared data channel to determine if data is scheduled for it;
   iii) While T319a is not running, monitors a Paging channel for CN paging using 5G-S-TMSI and RAN paging using full I-RNTI (full Inactive RNTI), except if the UE is acting as a L2 U2N Remote UE;
   iv) If configured by upper layers for MBS multicast reception, while T319a is not running, monitors a Paging channel for paging using TMGI;
   v) Performs neighbouring cell measurements and cell (re-)selection;
   vi) Performs measurements on L2 U2N Relay UEs and relay (re-)selection;
   vii) Performs RAN-based notification area updates periodically and when moving outside the configured RAN-based notification area;
   viii) Acquires system information and, while SDT (Small Data Transmission) procedure is not ongoing, can send SI (System Information) request (if configured);
   ix) While SDT procedure is not ongoing, performs logging of available measurements together with location and time for logged measurement configured UEs;
   x) While SDT procedure is not ongoing, performs idle/inactive measurements for idle/inactive measurement configured UEs;
   xi) If configured by upper layers for MBS broadcast reception, acquires MCCH (MBS Control Channel) change notification and MBS broadcast control information and data;
   xii) If configured for MBS multicast reception in RRC_INACTIVE, acquires multicast MCCH change notification and MBS multicast control information and data;
   xiii) Transmits SRS (Sounding Reference Signal) for Positioning.
3. RRC_CONNECTED:
   The UE stores the AS context;
   Transfer of unicast data to/from UE;
   Transfer of MBS multicast data to UE;
   At lower layers, the UE may be configured with a UE specific DRX;
   At lower layers, the UE may be configured with a DRX for PTM transmission of MBS broadcast and/or a DRX for MBS multicast;
   At lower layers, the UE may be configured with a cell specific cell DTX/DRX;
   For UEs supporting CA (Carrier Aggregation), use of one or more SCells (Secondary Cells), aggregated with the SpCell (Special Cell), for increased bandwidth;
   For UEs supporting DC (Dual Connectivity), use of one SCG (Secondary Cell Group), aggregated with the MCG (Master Cell Group), for increased bandwidth;
   Network controlled mobility within NR, to/from E-UTRA, and to UTRA-FDD;
   Network controlled mobility (path switch) between a serving cell and a L2 U2N Relay UE, or vice versa, or between a source L2 U2N Relay UE and a target L2 U2N Relay UE;
   Network controlled MP (Multi-Path) operation.
   The UE:
   i) Monitors Short Messages transmitted with P-RNTI over DCI, if configured;
   ii) Monitors control channels associated with the shared data channel to determine if data is scheduled for it;
   iii) Provides channel quality and feedback information;
   iv) Performs neighbouring cell and/or L2 U2N relay measurements and measurement reporting;
   v) Acquires system information;
   vi) Performs immediate MDT measurement together with available location reporting;
   vii) If configured by upper layers for MBS broadcast reception, acquires MCCH change notification and MBS broadcast control information and data FIG. 3 shows an example of an SDT procedure in NR.

Small Data Transmission (SDT) is a procedure allowing data and/or signalling transmission while remaining in RRC_INACTIVE state (i.e. without transitioning to RRC_CONNECTED state). SDT is enabled on a radio bearer basis and can be initiated either by the UE in case of MO-SDT (Mobile Originated-SDT) or by the network in case of MT-SDT (Mobile Terminated-SDT). MO-SDT is initiated by the UE only if less than or equal to a configured amount of uplink (UL) data awaits transmission across all radio bearers for which SDT is enabled, the downlink (DL) RSRP (Reference Signal Received Power) is above a configured threshold, and a valid SDT resource is available. MT-SDT is initiated by the network with an indication to the UE in a paging message when DL data awaits transmission for radio bearers configured for SDT. Based on the indication, the UE initiates the MT-SDT only if the DL RSRP is above a configured threshold. When MT-SDT is initiated by the UE, a resume cause indicating MT-SDT is included in the RRC Resume Request message. Maximum duration the SDT procedure can last is dictated by a SDT failure detection timer that is configured by the network. Network can enable MO-SDT, MT-SDT, or both in a cell.

SDT procedure is initiated with either a transmission over RACH (configured via system information) or over Type 1 CG (configured grant) resources (configured via dedicated signalling in RRC Release message). The SDT resources can be configured on initial BWP (Bandwidth Part) for both RACH (Random Access Channel) and CG. RACH and CG resources for SDT can be configured on either or both of NUL (Normal Uplink) and SUL (Supplementary Uplink) carriers. The CG resources for SDT are valid only within the Pcell (Primary Cell) of the UE when the RRC Release message with suspend indication is received. CG resources are associated with one or multiple synchronization signal blocks (SSBs). For RACH, the network can configure 2-step and/or 4-step RA (Random Access) resources for MO-SDT. When both 2-step and 4-step RA resources for MO-SDT are configured, the UE selects the RA type. If MT-SDT procedure is initiated over RACH, only the RACH resources not configured for SDT can be used by the UE.

Figure 3:
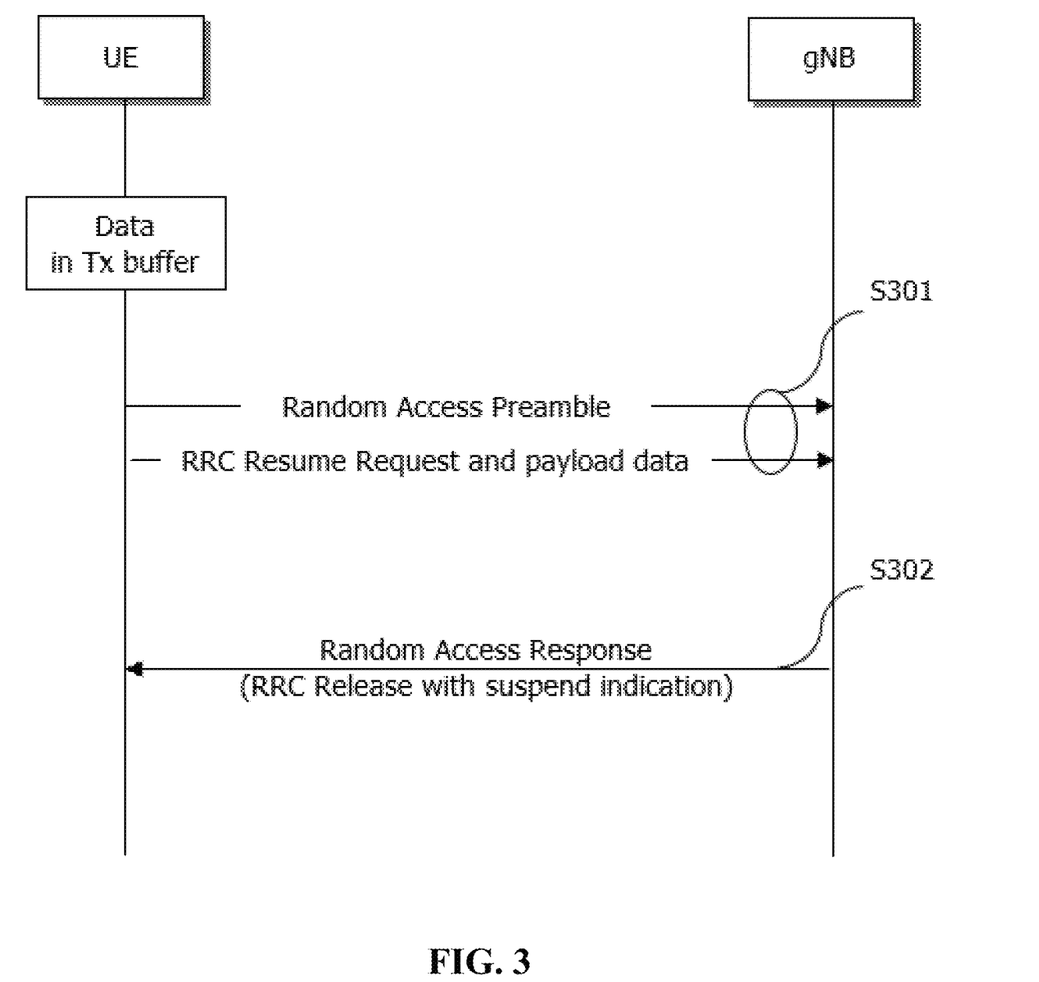
FIG. 3 shows an example of an SDT procedure in NR.

FIG. 3 shows an SDT procedure initiated with a transmission over RACH of 2-step RA. Referring to FIG. 3, when data for SDT is available in a transmission buffer, the UE transmits a random access preamble on PRACH (Physical Random Access Channel) and an RRC Resume Request message and a payload on PUSCH (S301). In response to the transmission, the UE receives a random access response and an RRC Release message with a suspend indication (S302). Upon receiving the response, the UE ends the random access procedure.

Figure 4:
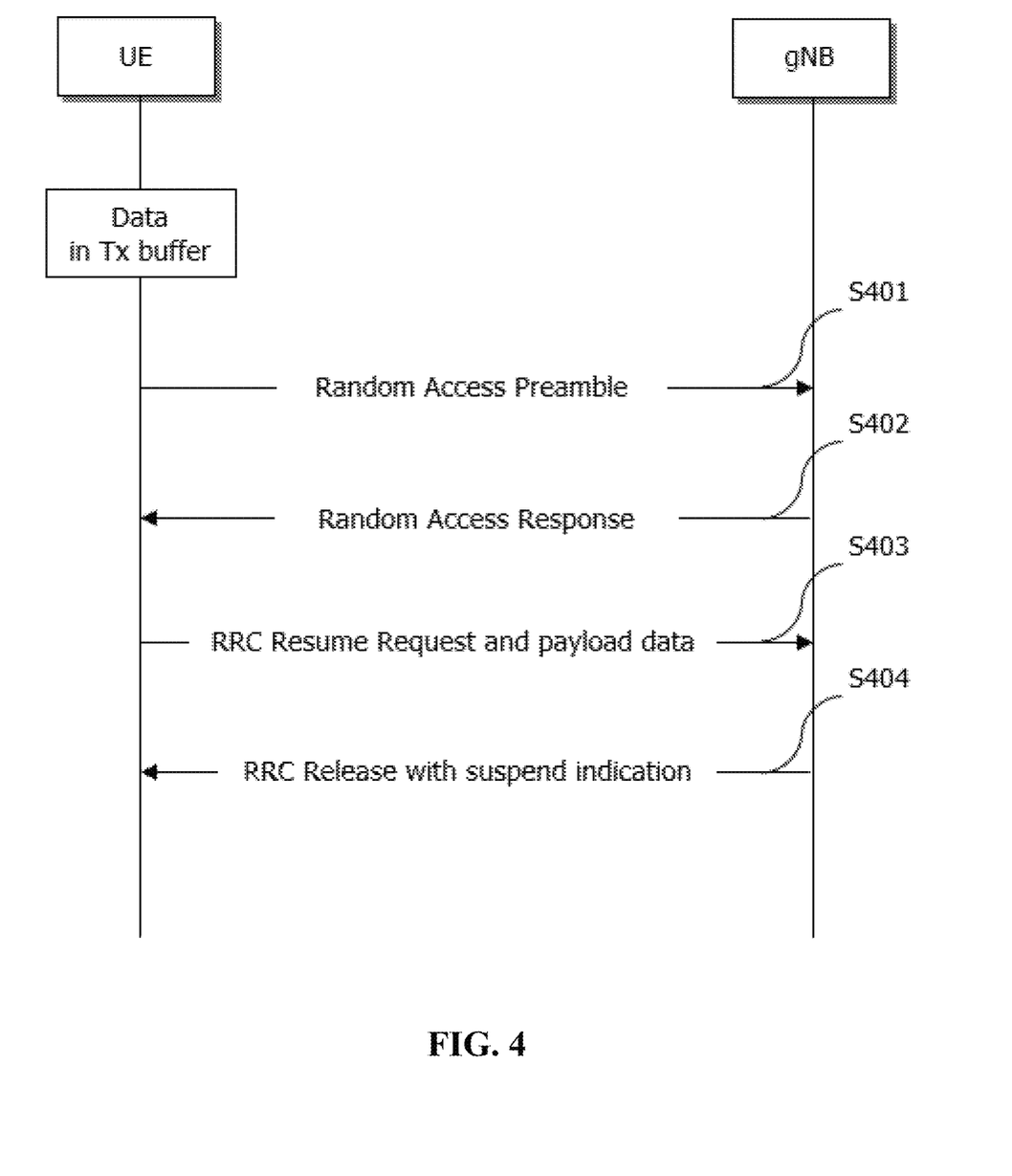
FIG. 4 shows another example of an SDT procedure in NR.

FIG. 4 shows another example of an SDT procedure in NR.

FIG. 4 shows an SDT procedure initiated with a transmission over RACH of 4-step RA. Referring to FIG. 4, when data for SDT is available in a transmission buffer, the UE transmits a random access preamble on PRACH (Physical Random Access Channel) (S401). In response to the transmission, the UE receives a random access response (S402). Upon reception of the random access response, the UE transmits an RRC Resume Request message and a payload on PUSCH using UL grant scheduled in the random access response (S403). After receiving an RRC Release message with a suspend indication (S404), the random access procedure ends.

Figure 5:
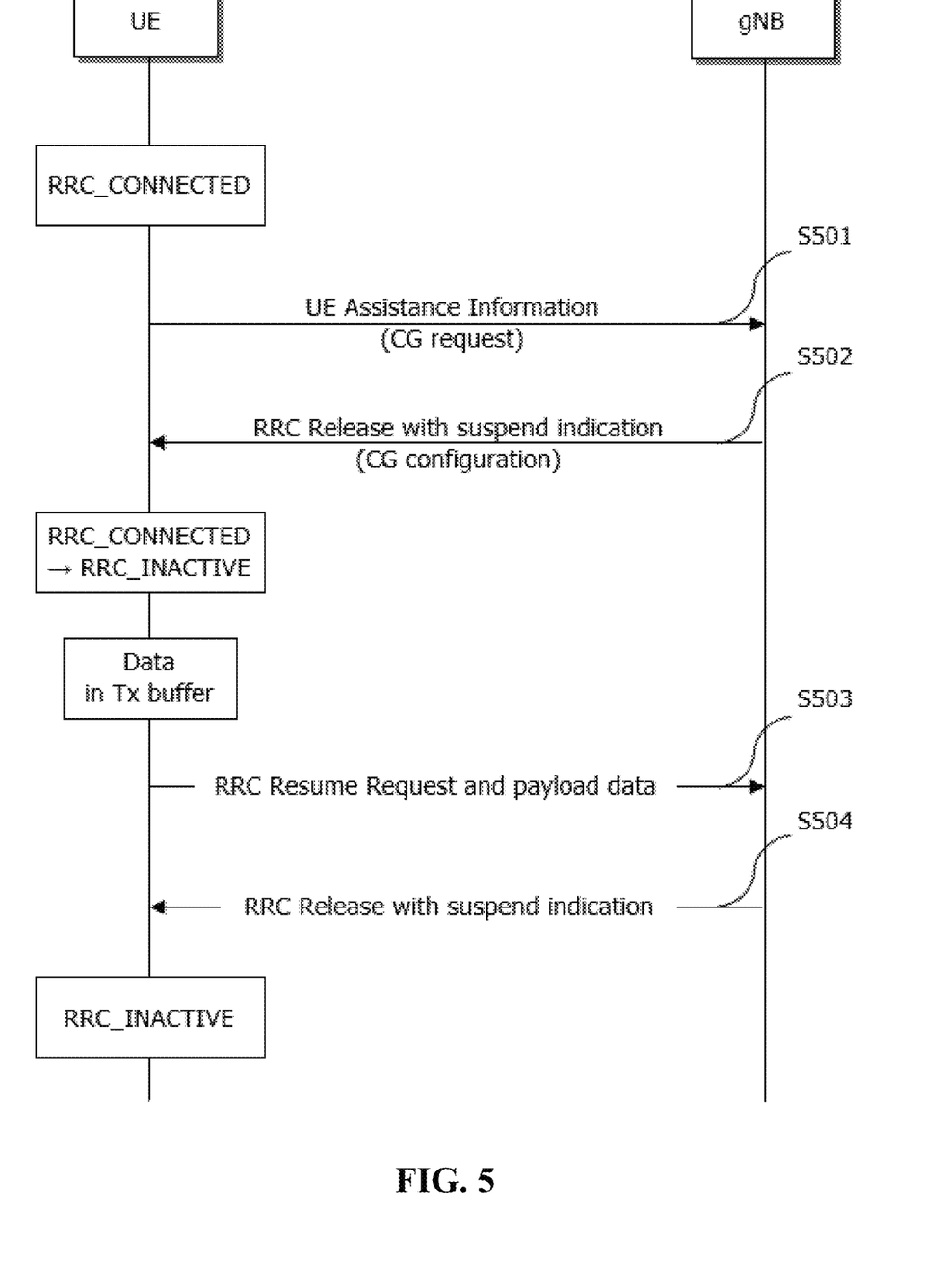
FIG. 5 shows still another example of an SDT procedure in NR.

FIG. 5 shows still another example of an SDT procedure in NR.

FIG. 5 shows an SDT procedure initiated with a transmission over CG (configured grant) resources. The radio resources for SDT are allocated periodically based on the estimation of the UE's traffic requirements. For the SDT procedure over CG, there will be no radio resource collision with other UEs since radio resources are dedicated for each UE. The resource allocation is signalled to the UE by the base station when the UE leaves RRC connected state.

Referring to FIG. 5, the UE transmits a UE Assistance Information message with CG request in RRC connected state (S501). After the transmission of the UE Assistance Information message, the UE receives an RRC Release message with a suspend indication and CG configuration (S502). When UE's protocol transition from the RRC connected state to RRC inactive state happens and data for SDT is available in a transmission buffer, the UE transmits an RRC Resume Request message and a payload on PUSCH using the CG resources (S503). After receiving an RRC Release message with a suspend indication (S504), the UE remains in RRC inactive state.

The CG configuration is used to enable uplink transmission without dynamic grant, which is referred to as CG Type 1 configured by RRC. An example of such a CG configuration is illustrated as a CG configuration information element in Table 1 below.

TABLE 1

```
-- ASN1START
-- TAG-CONFIGUREDGRANTCONFIG-START
...
rrc-ConfiguredUplinkGrant                SEQUENCE {
    timeDomainOffset                       INTEGER (0..5119),
    timeDomainAllocation                   INTEGER (0..15),
    frequencyDomainAllocation              BIT STRING (SIZE(18)),
    antennaPort                            INTEGER (0..31),
    dmrs-SeqInitialization                        INTEGER (0..1)
OPTIONAL,  -- Need R
    precodingAndNumberOfLayers             INTEGER (0..63),
    srs-ResourceIndicator                         INTEGER (0..15)
OPTIONAL,  -- Need R
    mcsAndTBS                              INTEGER (0..31),
    frequencyHoppingOffset                        INTEGER (1..
maxNrofPhysicalResourceBlocks-1)                  OPTIONAL,
-- Need R
    pathlossReferenceIndex                 INTEGER (0..maxNrofPUSCH-
PathlossReferenceRSs-1),
    ...,
    [[
    pusch-RepTypeIndicator-r16                    ENUMERATED {pusch-
RepTypeA,pusch-RepTypeB}                          OPTIONAL,  --
Need M
        frequencyHoppingPUSCH-RepTypeB-r16        ENUMERATED
{interRepetition, interSlot}                      OPTIONAL,  --
Cond RepTypeB
        timeReferenceSFN-r16                      ENUMERATED {sfn512}
OPTIONAL  -- Need S
    ]],
    [[
    pathlossReferenceIndex2-r17            INTEGER (0..maxNrofPUSCH-
PathlossReferenceRSs-1)                    OPTIONAL,  -- Need R
        srs-ResourceIndicator2-r17                INTEGER (0..15)
OPTIONAL,  -- Need R
        precodingAndNumberOfLayers2-r17           INTEGER (0..63)
OPTIONAL,  -- Need R
        timeDomainAllocation-v1710                INTEGER (16..63)
OPTIONAL,  -- Need M
        timeDomainOffset-r17                      INTEGER (0..40959)
OPTIONAL,  -- Need R
        cg-SDT-Configuration-r17           CG-SDT-Configuration-r17
OPTIONAL  -- Need M
    ]],
    [[
```

TABLE 1-continued

```
srs-ResourceSetId-r18                    SRS-ResourceSetId
OPTIONAL,  -- Need R
  cg-LTM-Configuration-r18               CG-RRC-Configuration-r18
OPTIONAL, -- Cond LTM
  cg-SDT-PeriodicityExt-r18              ENUMERATED {
                                           sym1x14x1280,
sym2x14x1280, sym4x14x1280, sym8x14x1280, sym16x14x1280,
                                           sym32x14x1280,
sym48x14x1280, sym64x14x1280, sym96x14x1280, sym128x14x1280,
                                           sym192x14x1280,
sym240x14x1280, sym256x14x1280, sym384x14x1280, sym472x14x1280,
                                           sym480x14x1280,
sym512x14x1280, sym768x14x1280, sym944x14x1280, sym960x14x1280,
                                           sym1408x14x1280,
sym1536x14x1280, sym1888x14x1280, sym1920x14x1280,
                                           sym2816x14x1280,
sym3072x14x1280, sym3776x14x1280, sym5632x14x1280,
                                           sym6144x14x1280,
sym7552x14x1280, sym7680x14x1280, sym11264x14x1280,
                                           sym15104x14x1280,
sym15360x14x1280, sym22528x14x1280, sym30208x14x1280,
                                           sym45056x14x1280,
sym60416x14x1280, sym90112x14x1280, sym180224x14x1280,
                                           sym4x12x1280,
sym8x12x1280, sym16x12x1280, sym32x12x1280, sym192x12x1280,
                                           sym384x12x1280,
sym960x12x1280, sym1888x12x1280, sym3776x12x1280,
                                           sym5632x12x1280,
sym11264x12x1280, spare13, spare12, spare11, spare 10, spare9,
                                           spare8, spare7, spare6,
spare5, spare4, spare3, spare2, spare1
                                         }
OPTIONAL,  -- Need R
  timeReferenceHyperSFN-r18              INTEGER (0..1023)
OPTIONAL,  -- Need R
...
-- TAG-CONFIGUREDGRANTCONFIG-STOP
-- ASN1STOP
```

The cg-SDT-PeriodicityExt parameter in Table 1 is used to calculate the periodicity for uplink (UL) transmission without UL grant for type 1 for extended CG-SDT periodicities. The following periodicities, in units of symbols, are supported depending on the configured subcarrier spacing:

15 kHz: n*14*1280, where n={1, 2, 4, 8, 48, 96, 240, 472, 944, 1408, 2816}

30 kHz: n*14*1280, where n={2, 4, 8, 16, 96, 192, 480, 944, 1888, 2816, 5632}

60 kHz with normal CP: n*14*1280, where n={4, 8, 16, 32, 192, 384, 960, 1888, 3776, 5632,11264}

60 kHz with ECP: n*12*1280, where n={4, 8, 16, 32, 192, 384, 960, 1888, 3776, 5632,11264}

120 kHz: n*14*1280, where n={8, 16, 32, 64, 384, 768, 1920, 3776, 7552, 11264, 22528} 480 kHz: n*14*1280, where n={32, 64, 128, 256, 1536, 3072, 7680, 15104, 30208, 45056, 90112}

960 kHz: n*14*1280, where n={64, 128, 256, 512, 3072, 6144, 15360, 30208, 60416, 90112, 180224}

The timeReferenceSFN parameter in Table 1 indicates the system frame number (SFN) used for determination of the offset of a resource in time domain. The UE uses the closest SFN with the indicated number preceding the reception of the configured grant configuration.

The timeReferenceH-SFN parameter in Table 1 indicates the hyper-SFN (H-SFN) used for determination of the offset of a resource in time domain. The UE uses the closest H-SFN with the indicated number preceding the reception of the configured grant configuration.

If the cg-SDT-PeriodicityExt parameter is configured, the UE determines a time-domain resource, expressed in symbol units, for uplink transmission without requiring a dynamic uplink grant based on a configured periodicity. Specifically, for the N-th occurrence (N≥0) of the configured periodicity, the UE considers that a CG occasion for transmission occurs at the time instance satisfying the following condition:

$$[(\text{H-SFN} \times \text{numberOfSFNperH-SFN} + \text{SFN}) \times \text{numberOfSlotsPerFrame} \times \text{numberOfSymbolsPerSlot} + (\text{slot number in the frame} \times \text{numberOfSymbolsPerSlot}) + \text{symbol number in the slot}] = ((\text{timeReferenceH-SFN} \times \text{numberOfSFNperH-SFN} + \text{timeReferenceSFN}) \times \text{numberOfSlotsPerFrame} \times \text{numberOfSymbolsPerSlot} + \text{timeDomainOffset} \times \text{numberOfSymbolsPerSlot} + S + N \times \text{periodicity}) \\ \text{modulo}(1024 \times 1024 \times \text{numberOfSlotsPerFrame} \times \text{numberOfSymbolsPerSlot}),$$

where:

H-SFN and SFN represent the current H-SFN and SFN, respectively;

slotNumber and symbolNumber denote the slot index and symbol index within the current frame and slot;

timeReferenceH-SFN and timeReferenceSFN indicate reference timing values provided by the network (e.g., via RRC signaling);

timeDomainOffset specifies the offset from the reference slot;

S is the symbol offset within a slot;

periodicity (e.g., cg-SDT-PeriodicityExt) refers to the configured periodicity (in symbols) for CG-SDT;

The modulo operation ensures wrap-around across the entire range of the hyper SFN domain.

Meanwhile, a timer referred to as T319a may be used by the UE in association with SDT using CG resources while the UE is in an RRC inactive state. After the UE performs uplink transmission via a configured grant resource without receiving a dynamic uplink grant (e.g., for transmitting an SDT payload), the UE may initiate the T319a timer to wait for further signaling related to the RRC resume procedure. The T319a timer is started upon completion of the configured grant-based uplink transmission and is stopped when the UE receives or transmits a higher-layer signaling message, such as an RRC resume message or resume complete message, which indicates that the RRC connection has been resumed or re-established. If the T319a timer expires before such signaling is completed, the UE may determine that the RRC resume procedure has failed and may initiate a recovery procedure, such as reattempting the RRC resume or transitioning to an RRC idle state.

When a long CG-periodicity (i.e., extended CG-periodicity) is configured, the UE may not monitor paging for an extended period of time once an SDT procedure is triggered. Such behavior is undesirable and occurs only when an extended CG-periodicity is configured. Therefore, it is preferable that, when a long CG-periodicity is configured, the UE continues to monitor paging while waiting for the next CG occasion. To avoid unintended unavailability of paging reception, the requirement to monitor paging during the SDT procedure should be limited to UEs that are configured with long CG-periodicities. This allows the behavior to be applied selectively, only when such configuration is present.

Accordingly, when in the RRC inactive state, the UE monitors both core network (CN) paging using the 5G-S-TMSI (5G-System-Temporary Mobile Subscriber Identity) and radio access network (RAN) paging using the fullI-RNTI (full Inactive-Radio Network Temporary Identifier), while the SDT procedure is ongoing and the T319a timer is not running, provided that CG-SDT is selected and an extended CG-SDT periodicity (i.e., cg-SDT-PeriodicityExt) is configured.

Figure 6:
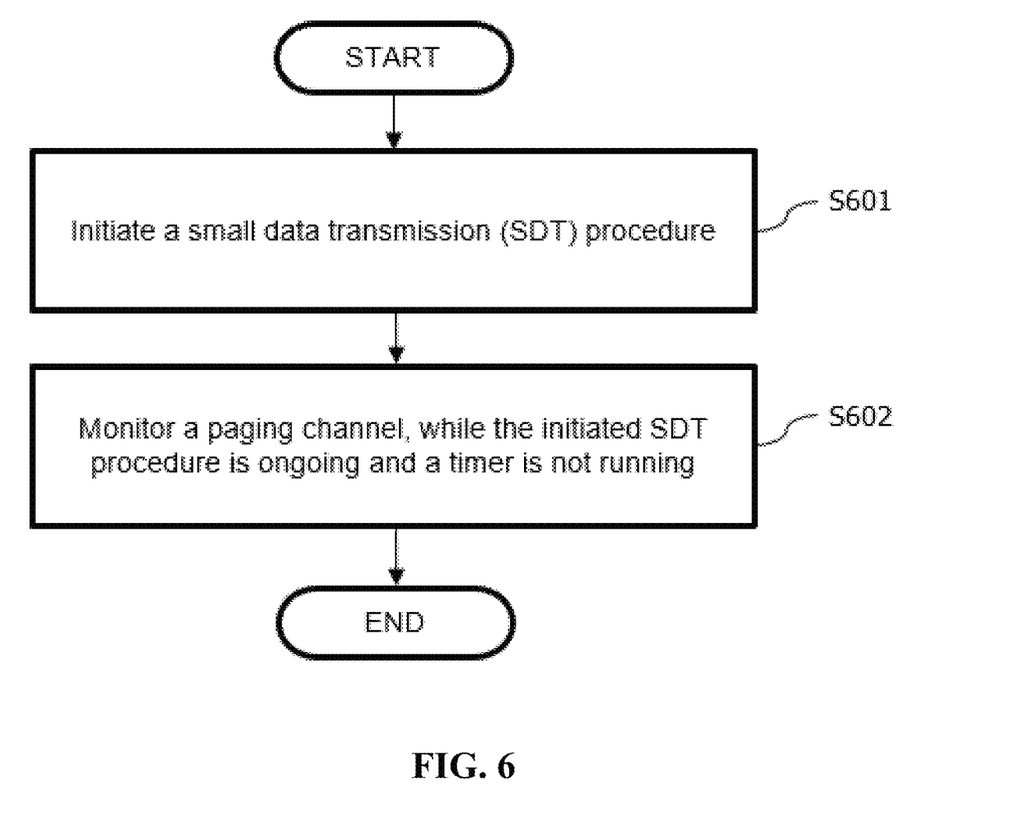
FIG. 6 is a flowchart showing a method of operating a terminal (UE) according to an embodiment of the disclosure.

FIG. 6 is a flowchart showing a method of operating a terminal (UE) according to an embodiment of the disclosure.

Referring to FIG. 6, the terminal initiates a small data transmission (SDT) procedure (S601). Then, the terminal monitors a paging channel, while the initiated SDT procedure is ongoing and a timer is not running (S602). The timer is associated with handling a failure in resumption of a radio resource control (RRC) connection. The paging channel is monitored based on that i) the SDT procedure is associated with configured grant (CG) SDT, and ii) an extended CG SDT periodicity is configured. The extended CG SDT periodicity is used to calculate a transmission periodicity for uplink that corresponds to a resource determined using hyper system frame number (H-SFN) information and system frame number (SFN) information.

The extended CG SDT periodicity, the H-SFN information and the SFN information are received in a single RRC information element. Here, The H-SFN information and the SFN information are used for determination of an offset of the resource in time domain.

Additionally, a paging channel monitoring indicator may be included in the single RRC information element. The paging channel monitoring indicator specifies whether monitoring of the paging channel by the terminal is required. Under certain conditions, the network may restrict the terminal from monitoring the paging channel, even when the extended CG SDT periodicity is configured. That is, if the paging channel monitoring indicator allows monitoring of the paging channel, the terminal may perform such monitoring. Accordingly, the terminal monitors the paging channel based on the received paging channel monitoring indicator, in addition to the SDT procedure being associated with CG SDT and the extended CG SDT periodicity being configured. If the terminal does not receive the paging channel monitoring indicator or if the paging channel monitoring indicator is indicated to disallow monitoring of the paging channel, the terminal does not perform paging channel monitoring.

The SDT procedure is initiated in an RRC inactive state.

Meanwhile, the extended CG SDT periodicity may be defined by n*14*1280, where n is a periodicity configuration value. The periodicity configuration value may be configured by one value in a first set consisting of 1, 2, 4, 8, 48, 96, 240, 472, 944, 1408 and 2816 for a subcarrier spacing (SCS) of 15 kHz, in a second set consisting of 2, 4, 8, 16, 96, 192, 480, 944, 1888, 2816 and 5632 for a SCS of 30 kHz, in a third set consisting of 4, 8, 16, 32, 192, 384, 960, 1888, 3776, 5632 and 11264 for a SCS of 60 kHz, in a fourth set consisting of 8, 16, 32, 64, 384, 768, 1920, 3776, 7552, 11264 and 22528 for a SCS of 120kH, in a fifth set consisting of 32, 64, 128, 256, 1536, 3072, 7680, 15104, 30208, 45056 and 90112 for a SCS of 480 kHz, or in a sixth set consisting of 64, 128, 256, 512, 3072, 6144, 15360, 30208, 60416, 90112 and 180224 for a SCS of 960 kHz.

Alternatively, the extended CG SDT periodicity may be defined by n*12*1280, where n is a periodicity configuration value. The periodicity configuration value may be configured by one value in a third set consisting of 4, 8, 16, 32, 192, 384, 960, 1888, 3776, 5632 and 11264 for a subcarrier spacing (SCS) of 60 kHz.

The disclosure described so far may be implemented through various means. For example, the embodiment may be implemented by hardware, firmware, software, or a combination thereof. Specifically, the implementation will be described below with reference to the accompanying drawing.

Figure 7:
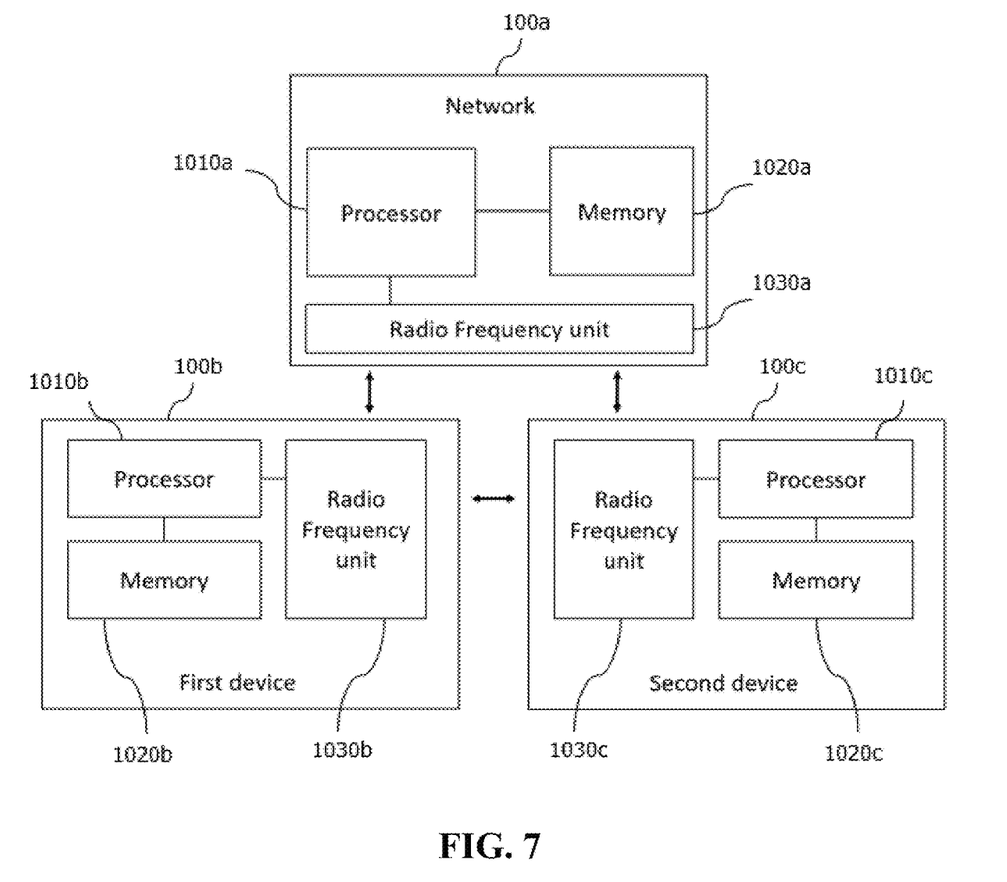
FIG. 7 is a block diagram showing apparatuses according to an embodiment of the disclosure.

FIG. 7 is a block diagram showing apparatuses according to an embodiment of the disclosure.

Referring to FIG. 7, a wireless communication system may include a network 100*a*, a first apparatus 100*b* and a second apparatus 100*c*.

The network 100*a* may include a base station, a network node, an apparatus related to 5G service, or other apparatuses related to the fourth industrial revolution.

The first device 100*b* may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (Fin-Tech) apparatus (or a financial apparatus), a security apparatus, a climate/environment apparatus, an apparatus related to a 5G service, or other apparatuses related to the fourth industrial revolution.

The second device 100*c* may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (Fin-Tech) apparatus (or a financial apparatus), a security apparatus, a climate/environment apparatus, an apparatus related to a 5G service, or other apparatuses related to the fourth industrial revolution.

The network 100a may include at least one processor such as a processor 1010a, at least one memory such as a memory 1020a and at least one radio frequency unit such as a radio frequency unit 1030a. The processor 1010a may be tasked with executing the previously mentioned functions, procedures, and/or methods. The processor 1010a may be capable of implementing one or more protocols. For example, the processor 1010a may perform and manage one or more layers of a radio interface protocol. The memory 1020a may be connected to the processor 1010a, and configured to store various types of information and/or instructions. The radio frequency unit 1030a may be connected to the processor 1010a, and controlled to transceive radio signals.

The first device 100b may include at least one processor such as a processor 1010b, at least one memory such as a memory 1020b and at least one radio frequency unit such as a radio frequency unit 1030b. The processor 1010b may be tasked with executing the previously mentioned functions, procedures, and/or methods. The processor 1010b may be capable of implementing one or more protocols. For example, the processor 1010b may perform and manage one or more layers of a radio interface protocol. The memory 1020b may be connected to the processor 1010b, and configured to store various types of information and/or instructions. The radio frequency unit 1030b may be connected to the processor 1010b, and controlled to transceive radio signals.

The second device 100c may include at least one processor such as a processor 1010c, at least one memory such as a memory 1020c and at least one radio frequency unit such as a radio frequency unit 1030c. The processor 1010c may be tasked with executing the previously mentioned functions, procedures, and/or methods. The processor 1010c may be capable of implementing one or more protocols. For example, the processor 1010c may perform and manage one or more layers of a radio interface protocol. The memory 1020c may be connected to the processor 1010c, and configured to store various types of information and/or instructions. The radio frequency unit 1030c may be connected to the processor 1010c, and controlled to transceive radio signals.

The memory 1020a, the memory 1020b and/or the memory 1020c may be respectively connected inside or outside the processor 1010a, the processor 1010b and/or the processor 1010c and connected to other processors through various technologies such as wired or wireless connection.

According to the embodiment of the disclosure, efficient paging channel monitoring associated with a small data transmission (SDT) procedure in a wireless communication system may be performed.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method for a terminal to operate in a wireless communication system, the method comprising:
   initiating a small data transmission (SDT) procedure; and
   monitoring a paging channel, while the initiated SDT procedure is ongoing and a timer is not running,
   wherein the timer is associated with handling a failure in resumption of a radio resource control (RRC) connection,
   wherein the paging channel is monitored based on that i) the SDT procedure is associated with configured grant (CG) SDT, and ii) an extended CG SDT periodicity is configured, and
   wherein the extended CG SDT periodicity is used to calculate a transmission periodicity for uplink that corresponds to a resource being determined using hyper system frame number (H-SFN) information and system frame number (SFN) information,
   wherein the extended CG SDT periodicity is defined by at least one of n*14*1280 or n*12*1280, where n is a periodicity configuration value.

2. The method of claim 1, wherein the extended CG SDT periodicity, the H-SFN information and the SFN information are received in a single RRC information element.

3. The method of claim 2, wherein the H-SFN information and the SFN information are used for determination of an offset of the resource in time domain.

4. The method of claim 1, wherein the SDT procedure is initiated in an RRC inactive state.

5. The method of claim 1, wherein, when the extended CG SDT periodicity is defined by n*14*1280, the periodicity configuration value is configured by one value in a first set consisting of 1, 2, 4, 8, 48, 96, 240, 472, 944, 1408 and 2816 for a subcarrier spacing (SCS) of 15 kHz, in a second set consisting of 2, 4, 8, 16, 96, 192, 480, 944, 1888, 2816 and 5632 for a SCS of 30 kHz, in a third set consisting of 4, 8, 16, 32, 192, 384, 960, 1888, 3776, 5632 and 11264 for a SCS of 60 kHz, in a fourth set consisting of 8, 16, 32, 64, 384, 768, 1920, 3776, 7552, 11264 and 22528 for a SCS of 120kH, in a fifth set consisting of 32, 64, 128, 256, 1536, 3072, 7680, 15104, 30208, 45056 and 90112 for a SCS of 480 kHz, or in a sixth set consisting of 64, 128, 256, 512, 3072, 6144, 15360, 30208, 60416, 90112 and 180224 for a SCS of 960 kHz.

6. The method of claim 1, wherein, when the extended CG SDT periodicity is defined by n*12*1280, the periodicity configuration value is configured by one value in a third set consisting of 4, 8, 16, 32, 192, 384, 960, 1888, 3776, 5632 and 11264 for a subcarrier spacing (SCS) of 60 KHz.

7. A terminal in a wireless communication system comprising:
   a processor configured to cause the terminal to:
   initiate a small data transmission (SDT) procedure; and
   monitor a paging channel, while the initiated SDT procedure is ongoing and a timer is not running,
   wherein the timer is associated with handling a failure in resumption of a radio resource control (RRC) connection,
   wherein the paging channel is monitored based on that i) the SDT procedure is associated with configured grant (CG) SDT, and ii) an extended CG SDT periodicity is configured, and
   wherein the extended CG SDT periodicity is used to calculate a transmission periodicity for uplink that corresponds to a resource determined using hyper system frame number (H-SFN) information and system frame number (SFN) information,
   wherein the extended CG SDT periodicity is defined by at least one of n*14*1280 or n*12*1280, where n is a periodicity configuration value.

8. The terminal of claim 7, wherein the extended CG SDT periodicity, the H-SFN information and the SFN information are received in a single RRC information element.

9. The terminal of claim 8, wherein the H-SFN information and the SFN information are used for determination of an offset of the resource in time domain.

10. The terminal of claim 7, wherein the SDT procedure is initiated in an RRC inactive state.

11. The terminal of claim 7, wherein, when the extended CG SDT periodicity is defined by n*14*1280, the periodicity configuration value is configured by one value in a first set consisting of 1, 2, 4, 8, 48, 96, 240, 472, 944, 1408 and 2816 for a subcarrier spacing (SCS) of 15 kHz, in a second set consisting of 2, 4, 8, 16, 96, 192, 480, 944, 1888, 2816 and 5632 for a SCS of 30 kHz, in a third set consisting of 4, 8, 16, 32, 192, 384, 960, 1888, 3776, 5632 and 11264 for a SCS of 60 kHz, in a fourth set consisting of 8, 16, 32, 64, 384, 768, 1920, 3776, 7552, 11264 and 22528 for a SCS of 120kH, in a fifth set consisting of 32, 64, 128, 256, 1536, 3072, 7680, 15104, 30208, 45056 and 90112 for a SCS of 480 kHz, or in a sixth set consisting of 64, 128, 256, 512, 3072, 6144, 15360, 30208, 60416, 90112 and 180224 for a SCS of 960 kHz.

12. The terminal of claim 7, wherein, when the extended CG SDT periodicity is defined by n*12*1280, the periodicity configuration value is configured by one value in a third set consisting of 4, 8, 16, 32, 192, 384, 960, 1888, 3776, 5632 and 11264 for a subcarrier spacing (SCS) of 60 KHz.

* * * * *